Nov. 5, 1968  E. J. HELM  3,409,283
APPARATUS FOR TREATING EXHAUST GASES FROM AN OXYGEN CONVERTER
Filed June 16, 1966  2 Sheets-Sheet 2

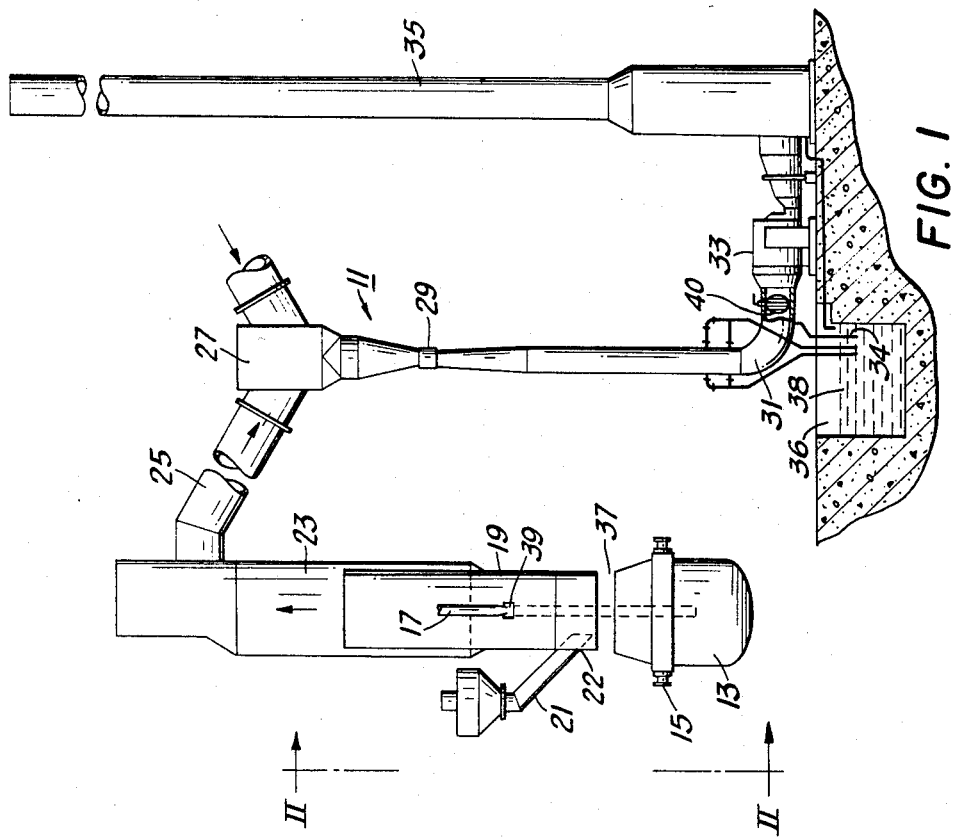
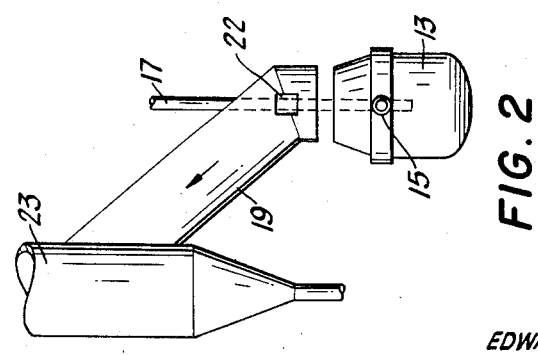

INVENTOR.
EDWARD J. HELM
BY Sherman H. Barber
his Attorney

United States Patent Office 3,409,283
Patented Nov. 5, 1968

3,409,283
APPARATUS FOR TREATING EXHAUST GASES FROM AN OXYGEN CONVERTER
Edward J. Helm, Pittsburgh, Pa., assignor to Koppers Company, Inc., a corporation of Delaware
Filed June 16, 1966, Ser. No. 558,110
1 Claim. (Cl. 266—36)

ABSTRACT OF THE DISCLOSURE

A substantially airtight hood is spaced apart a preselected distance from the mouth of a BOF converter, and during the oxygen blowing period, the gases evolving from the converter, plus ambient air in quantity sufficient to oxidize at least 20 percent of the CO generated in the converter, pass into the hood under the draft supplied by an exhaust fan that operates at constant speed and exhausts a constant volume of gases per unit of time.

---

The present invention relates to steelmaking and more particularly to an improved gas collecting system for use with oxygen steelmaking vessels.

In the basic oxygen furnace, oxygen is blown into the molten metal in the converter and the oxygen reacts with the carbon of the hot metal to form mainly CO. While the reaction is involved and while there is also some reaction of oxygen with a portion of the Co within the vessel near the oxygen jet to form $CO_2$, nevertheless, for purposes of this invention, the minimum air intake quantities at the hood are related to the blowing rate by assuming that 100% of the oxygen that is blown into the converter reacts to form CO only.

In the top-blowing steelmaking art, the maximum rate of CO generation occurs near the mid-portion of the oxygen blowing period. At the beginning of the blowing period and near the end of the blowing period, the CO generation rate is much less than the maximum, so that an induced draft fan, operating in accordance with this invention at constant speed, may draw in more than enough air to burn all the available CO to $CO_2$ at both the beginning and the end of the blowing period. For this reason, the unburned CO content in the gases traveling through a cooling and cleaning train of apparatus may vary from nil at the beginning of the blow to an appreciable CO content near the mid-portion of the blow and back again to nil at the end of the blowing period.

The most important consideration of the basic oxygen furnace plant operation is to provide continuous operation of the steelmaking vessels at peak production rates, with minimum interference and interruption caused by a failure of auxiliary equipment or the fault of other outside sources. For this reason, most operators prefer gas cooling and cleaning systems which provide the simplest and most foolproof methods of control, with the least likelihood of breakdown and consequent interruption of production. Complicated control methods and equipment for recovery of unburned CO gas for use as an external fuel are generally considered undesirable because of interference with the steelmaking operations.

According to this invention, a system for treating the exhaust gases evolving from an oxygen converter, as a result of the reaction of blown-in oxygen and hot metal in the container, comprises a hood that is spaced apart from the mouth of the converter a preselected distance and that is connected by a conduit to an exhaust fan operating at substantially constant speed so that the volume of gases passing through the hood, conduit, and fan is substantially constant. The volumetric capacity of the exhaust fan is always greater than the volume of gases evolving from the converter; the difference in volumes being made up by sufficient air that enters the hood, through the space between the hood and the mouth of the converter, to oxidize to $CO_2$ at leasty twenty percent of the maximum CO that could be formed by the oxygen that is blown into the hot metal in the converter.

In one aspect of the invention a skirt is movable either vertically from a position above the gap between the hood and the mouth of the converter, or horizontally into a position within the gap, for the purpose of reducing the amount of air that enters the hood at the gap.

For a further understanding of the present invention and for advantages and features thereof, reference may be made to the following description taken in conjunction with the accompanying drawings which show, for the purpose of exemplification, a preferred embodiment of the invention.

In the drawings:

FIG. 1 is a schematic arrangement of apparatus suitable for carrying out the method of the invention;

FIG. 2 is a view along line II—II of FIG. 1;

Figure 3:
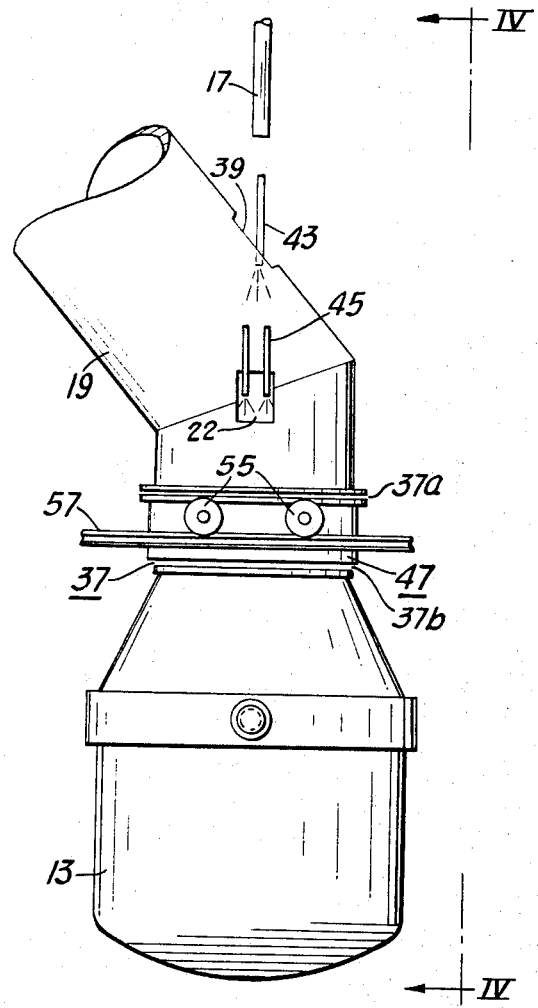
FIG. 3 is a schematic arrangement of a portion of another apparatus (at an enlarged scale) suitable for practicing the method of the invention.

Referring to FIG. 1, apparatus 11 that is suitable for carrying out the method of the invention comprises a conventional basic oxygen converter 13 supported in the usual manner on trunnions 15 for rotation in a vertical plane about a horizontal axis in the trunnions 15. Associated with the basic oxygen converter 13 is a conventional oxygen lance 17 that is adapted for movement vertically downward into the basic oxygen converter 13 before the oxygen blowing period and upwards out of the converter after the oxygen blowing period is over. The oxygen lance 17 of FIG. 1 is shown in the blowing position within the basic oxygen converter. Also, closely associated with both the basic oxygen converter 13 and the oxygen lance 17, is an exhaust gas hood 19 that may be of the water cooled or steam generating type. A suitable type of exhaust gas hood 19 should be substantially airtight to prevent the entry of ambient air into the hood 19 from the outside, except, as mentioned hereinafter, at the space or gap between the hood and the mouth of the converter vessel 13 and at the necessary openings in the hood. Complementary of the hood 19 is a flux-holding hopper and chute arrangement 21 that extends through an opening 22 in the hood and that is adapted to discharge flux material into the converter 13. The flux-holding hopper and chute arrangement 21 is adapted to hold and discharge additives in the melt when desirable or necessary.

The hood 19 leads generally angularly upward from just above the converter and communicates with an evaporation chamber 23 that may be similar to the evaporation chamber disclosed in copending application Ser. No. 418,456, filed Dec. 15, 1964, now Patent No. 3,345,057.

From the evaporation chamber 23, the exhaust gases pass through a conduit 25 into a conventional transition piece 27. The gases are thereafter directed through a conventional venturi scrubber 29 and a mist eliminator 31, and enter an induced draft fan 33. A suitable drain conduit 34 is provided at the bottom of the separating elbow portion of the mist eliminator to conduct water coming from the venturi scrubber 29 to a drain sump 36 in the foundation. Preferably, the drain conduit 34 terminates below the level of water 38 in the sump 36 thereby sealing the drains and preventing the entrance of air into the system through otherwise open drain lines.

The induced draft fan 33 operates at substantially a constant speed to remove the gases at a rate that is somewhat greater than maximum rate at which the gases evolve at the converter's mouth. That is to say, the induced draft fan 33 has a volumetric capacity that is large enough to handle the maximum flow of gases issuing from the converter as well as the flow of air that is drawn into the hood 19 at the opening between the hood 19 and the mouth of the converter 13.

As shown schematically in FIG. 1, though, an adjustable louver damper 40 is provided in the gas conduit between the mist eliminator 31 and the induced draft fan 33 to regulate the total flow of gas plus air to the induced draft fan 33.

From the induced draft fan 33, the gases may pass either to atmosphere through a stack 35, or through a seal (not shown) to a gas storage holder in the conventional manner. In a particular application, there may be one, two, or more basic oxygen furnaces 13, which simultaneously discharge gases into the transition piece 27 (FIG. 1) and into the induced draft fan 33 via the venturi scrubber 29 and mist eliminator 31. There also may be two or more venturi scrubbers and fans in any particular installation.

The induced draft fan 33 of the present invention operates at substantially a constant speed and moves, per unit of time, a constant volume of gas mixture that is in excess of the maximum expected rate of gas evolution from the steelmaking vessel 13. Further, the hood 19 may, in one aspect of the invention, be spaced apart from the mouth of the converter 13 a predetermined distance, forming the gap 37, that admits air into the hood 19 at a rate sufficient to oxidize at least about twenty percent of the maximum CO that could be formed by the stoichiometric reaction of carbon with the oxygen that is blown into the hot metal in the converter 13. Of course, the volume of air pulled into the hood 19 at the gap 37 may be greater than the volume of air required to burn the twenty percent of CO. In any case, however, the gap 37 should be of such a size, the fan 33 should be operated in such a range of speeds, and the louver damper 40 so positioned, that it will pull into the hood sufficient air to seal the gap 37 against the outward flow of dust-laden gases from the steelmaking vessel 13. Yet, the fan 33 should not be so operated that the volume of air drawn into the hood, when combined with the gases evolving from the furnace 13, requires unreasonably large gas cleaning equipment, fan, and ducts. Further, in a particular application, the louver damper would be set and left in such position and the rate of flow of air in the system would change in the following manner: as the rate of gas flow from the converter increases, so the rate of flow of air at the gap 37 would decrease, and as the rate of gas flow decreases, so the rate of air flow at the gap increases. The total amount of air and gas flowing in the system is then practically constant.

In practice, a relatively wide gap 37 between the hood and the mouth of the converter is desired by many operators to avoid any difficulty that might arise with a close-fitting hood, such as the build-up of slag or metal around the mouth of the furnace vessel 13, or because chunks of slag build-up might fall from higher up in the hood. Then too, the relatively wide hood-converter gap 37 permits visual observation of the flame at the mouth of the converter in accordance with some preferred operating practices.

The advantages of a relatively wide gap 37 can be retained, and the escape of the dust-laden gases can be prevented, in accordance with the invention, by operating the induced draft fan 33 at substantially a constant speed and maintaining a controlled and limited flow of air through the gap 37 and into the hood 19.

As is customary, the oxygen lance 17 moves into and out of the converter vessel 13, through a lance entry hole 39 in the hood 19. Another opening 22 for the additive chute 21 is also customarily provided in the hood, in a location that may be oriented about 90° from the axial location of the lance entry hole 39 (FIG. 1).

To prevent exhaust gases from escaping to the atmosphere through these openings 39, 22, it is desirable to provide in each such opening one or more conduits 43, 45, each having a nozzle (not shown) on one end, from which a jet of steam or other inert gas is injected into the hood 19. The jet of steam, for example, creates a partial vacuum in the annulus of the openings 39, 22, and in this manner, a small amount of air is induced to flow into the hood 19; but, of greater importance, the waste gases are prevented from escaping to the atmosphere through these openings 39, 22.

These jets permit operating at lower suction in the hood without dirty gas being forced out through the openings 39, 22, in the hood by the velocity head or impact pressure of the gases. For a given gap between the hood and the mouth of the vessel, the lower suction in the hood permits operation with a reduced intake of air through this gap, reducing the air intake to as low as 20% of that required to burn all the CO that could be generated at the maximum rate of CO generation. This compares with 120 to 250% of the air required to burn all the CO, which is normal practice now where an open type hood is used.

In order to properly control the amount of air that enters the hood 19 and mixes with the off-gases, it is first desirable and necessary to provide and use a hood 19, and other gas cooling and cleaning equipment, that is substantially free of air leaks.

There may be times, while regulating the entrance of air to burn 20 percent of the theoretical maximum CO, that the gap is so wide, as originally built, that air may be sucked in at one side of the gap while dust-containing gases escape at another part of the opening. To overcome this possibility, a skirt may be provided to reduce the gap as required to prevent the escape of dirty gas while limiting the air drawn in to about 20 percent of the maximum theoretical air required. This skirt can be moved horizontally as shown, or may be lowered downwardly from a position above the gap and surrounding the hood (not shown).

Figure 4:
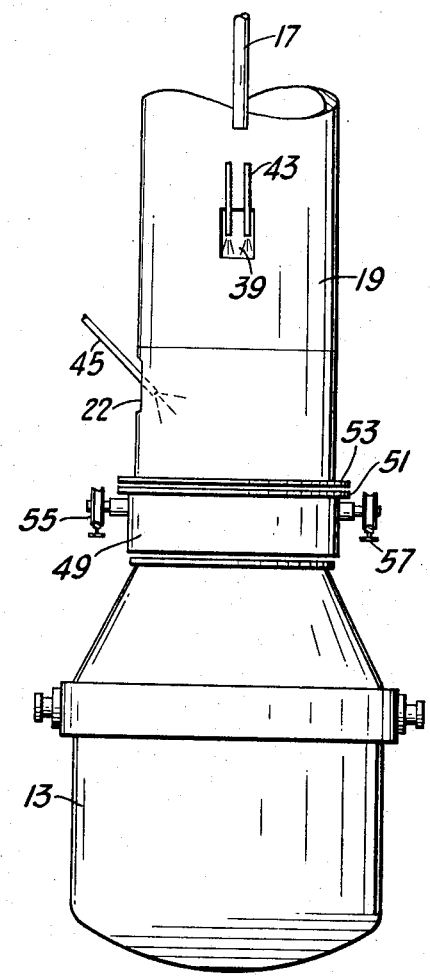
FIG. 4 is a view along line IV—IV of FIG. 3.

In the embodiment of the invention shown in FIGS. 1 and 2, the gap 37 between the hood 19 and the mouth of the converter 13 has dimensions that are established by operating circumstances, such as providing enough room to tilt the converter whenever necessary or desirable. Whereas in the embodiment of the invention shown in FIGS. 3 and 4, there is in the gap 37 between the hood and the mouth of the converter a skirt 47 that can be moved horizontally into the gap just prior to or at the commencement of the oxygen blowing period.

The skirt 47 comprises a cylindrical shell 49 having a flange 51 at the top edge that is substantially the same size as a flange 53 on the bottom edge of the hood 19; the lower edge of the skirt 47 is not provided with a flange. The internal diameter of the skirt is preferably somewhat larger than the diameter of the mouth of the converter 13. The skirt 47 is provided with two sets of spaced apart, oppositely disposed wheels 55 that engage and roll on rails 57 disposed on opposite sides of the hood 19 whereby the skirt 47 is movable horizontally into and out of the gap 37. By positioning of the skirt 47 in the gap 37, the effective area of the gap is reduced so that the difference in pressure across the gaps 37a, 37b, at the top and bottom of the skirt respectively, prevent the escape of dust-laden gases outwardly, while air flows into the gaps at a rate sufficient to combine with and oxidize to $CO_2$ at least twenty percent of the maximum CO that could be formed by the oxygen that is blown into the vessel as mentioned previously. Of course, suitably powered means (not shown) may be provided to move the skirt 47 horizontally on the rails 57.

Preferably, in accordance with the invention, a wet (water) gas cleaning system will be used. Electrostatictype precipitators are not recommended for removing dust particles from the gases emerging from the hood 19, because of the presence, generally, of substantial quantities of carbon monoxide (CO) during the mid-portion of the blowing period, and the possibility that an explosive mixture of CO and air might be formed and ignited by an electrical discharge in the precipitator.

Generally speaking, the volume of gas mixture passing through the fan 33 is constant, since it operates at a constant speed, and this gas mixture volume is made up of air drawn into the system through the gap 37 (or gaps 37a, 37b), the lance opening 39, and the additive chute opening 22, and the gas evolving from the converter 13. The amount of air that is admitted at the gap or gaps may be regulated by setting the louver dampers 40 and leaving them at such fixed setting during the oxygen blowing period. Then, enough air enters the system at the gap or gaps to oxidize to $CO_2$ at least 20 percent of the maximum CO that is formed by the oxygen blowing into the hot metal in the converter vessel 13.

Figure 5:
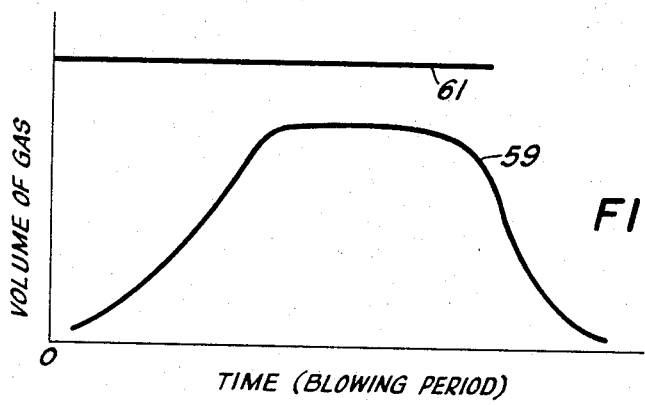
FIG. 5 is a graphic representation of gas evolution and extraction in accordance with the invention.

As shown in FIG. 5, over the oxygen blowing period of time, the volume of CO gas generated in the converter vessel 13 varies from about nil initially to a maximum value near the mid-point of the blowing period and then becomes about nil at the end of the blowing period. A curve representing such a variation in CO gas generated is designated 59, and the line 61 in FIG. 5 represents the constant volumetric capacity of the fan 33. Then, at any moment of time during the blowing period, the difference in ordinate between the line 61 and curve 59 represents the increase in volume caused by the volume of air that is being drawn into the hood at the gap 37. In accordance with this invention, at no time will the value of air drawn into the gap or gaps be less than the amount of air required to oxidize to CO2 about 20 percent of the maximum CO that is formed by the oxygen that is blown into the hot metal in the converter vessel 13.

A feature of the invention is that the apparatus needed to control the admission of the proper volume of air into the hood over a converter vessel is simple and effective. Generally speaking, operators of steel converter plants prefer gas collecting, cooling, and cleaning systems that provide the simplest and most reliable performance with the least likelihood of breakdown and consequent interruption of steel production. The apparatus of the present invention is reliable, and is simple to operate. There are few moving parts that might require maintenance such as the induced draft fan 33 and the skirt 47 if a skirt is used at all.

While the foregoing describes the invention with a certain degree of particularity, it is understood that the present disclosure has been made only as an example and that various modifications and changes may be made within the scope of the invention as defined in the appended claims.

What is claimed is:
1. A system for treating exhaust gases including CO generated in a converter vessel during an oxygen blowing period to reduce molten metal in said converter to steel comprising:
 (a) an oxygen lance adapted to blow oxygen against said metal and generate said exhaust gases;
 (b) a substantially airtight hood arranged in a preselected spaced apart relation to said converter for receiving said exhaust gases, said hood having therein an opening for admitting said lance and an opening for admitting additive material into said converter;
 (c) means for introducing an inert gaseous substance into said hood at said openings whereby the gases collected in said hood do not emerge therefrom through said lance opening;
 (d) a skirt positionable in the space between said hood and said converter adapted to pass therethrough the gases evolving from said converter and to limit the amount of ambient air admitted into said hood around said skirt;
 (e) a conduit connecting said hood for carrying the gas mixture, to
 (f) an exhaust fan adapted for operation at a constant speed whereby a constant volume of gas mixture is exhausted from said fan; and
 (g) an adjustable damper in said conduit that regulates the flow of gases plus air entering said fan system whereby the amount of ambient air entering said hood around said skirt is sufficient to oxidize at least twenty per cent of the CO that is generated in said converter during the period of maximum generation of CO during an oxygen blowing period.

References Cited

UNITED STATES PATENTS

| 3,190,747 | 6/1965 | Namy et al. | 75—60 |
| 3,301,662 | 1/1967 | Ban | 75—72 |
| 3,314,781 | 4/1967 | Johansson et al. | 75—52 |
| 3,341,324 | 12/1967 | Rieder | 75—60 |

FOREIGN PATENTS 944,058  12/1963  Great Britain.

RICHARD O. DEAN, *Primary Examiner.*